(12) United States Patent
Basso et al.

(10) Patent No.: US 7,881,332 B2
(45) Date of Patent: Feb. 1, 2011

(54) CONFIGURABLE PORTS FOR A HOST ETHERNET ADAPTER

(75) Inventors: Claude Basso, Raleigh, NC (US); Jean Louis Calvignac, Raleigh, NC (US); Chih-Jen Chang, Apex, NC (US); Philippe Damon, Raleigh, NC (US); Natarajan Vaidhyanathan, Carrboro, NC (US); Fabrice Jean Verplanken, La Gaude (FR); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/097,652

(22) Filed: Apr. 1, 2005

(65) Prior Publication Data
US 2006/0222002 A1    Oct. 5, 2006

(51) Int. Cl.
H04J 3/16    (2006.01)
(52) U.S. Cl. .................. 370/465; 370/391; 370/419; 370/366; 370/367
(58) Field of Classification Search ............. 370/465, 370/391, 419, 366, 367
See application file for complete search history.

(56) References Cited

U.S. PATENT DOCUMENTS

| | | | |
|---|---|---|---|
| 1,724,198 | A | 8/1929 | Hauser |
| 4,825,406 | A | 4/1989 | Bean et al. |
| 5,058,110 | A | 10/1991 | Beach et al. |
| 5,172,371 | A | 12/1992 | Eng et al. |
| 5,359,659 | A | 10/1994 | Rosenthal |
| 5,430,842 | A | 7/1995 | Thompson et al. |
| 5,442,802 | A | 8/1995 | Brent et al. |
| 5,752,078 | A | 5/1998 | Delp et al. |
| 5,983,274 | A | 11/1999 | Hyder et al. |
| 5,991,299 | A | 11/1999 | Radogna et al. |
| 6,041,058 | A | 3/2000 | Flanders et al. |
| 6,266,700 | B1 | 7/2001 | Baker et al. |

(Continued)

FOREIGN PATENT DOCUMENTS

WO    WO03049488 A1    6/2003

OTHER PUBLICATIONS

IP.Com, "Reusing a 10Gbps Ethernet Media Access Controller for a 1Gbps/100 Mbps/10Mbps Ethernet," loacted at www.ip.com, IP.com No. IPCOM000133402D, Jan. 25, 2006, 6 pages.

(Continued)

*Primary Examiner*—Huy D Vu
*Assistant Examiner*—Kibrom T Hailu
(74) *Attorney, Agent, or Firm*—Jason O. Piche; Jeffrey L. Streets

(57) ABSTRACT

A system and method in accordance with the present invention allows for an adapter to be utilized in a server environment that can accommodate both a 10 G and a 1 G source utilizing the same pins. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources. Finally the system allows for the adapter to use the same pins for multiple data sources.

17 Claims, 4 Drawing Sheets

U.S. PATENT DOCUMENTS

| | | |
|---|---|---|
| 6,400,730 B1 | 6/2002 | Latif et al. |
| 6,427,169 B1 | 7/2002 | Elzur |
| 6,650,640 B1 | 11/2003 | Muller et al. |
| 6,658,002 B1 | 12/2003 | Ross et al. |
| 6,678,746 B1 | 1/2004 | Russell et al. |
| 6,724,769 B1 | 4/2004 | Sang |
| 6,728,929 B1 | 4/2004 | Luong |
| 6,735,670 B1 | 5/2004 | Bronstein et al. |
| 6,751,229 B1 | 6/2004 | Waller et al. |
| 6,754,662 B1 | 6/2004 | Li |
| 6,788,697 B1 | 9/2004 | Aweya et al. |
| 6,795,870 B1 | 9/2004 | Bass et al. |
| 6,822,968 B1 | 11/2004 | Lim |
| 6,937,574 B1 | 8/2005 | Delaney et al. |
| 6,954,463 B1 | 10/2005 | Ma et al. |
| 6,970,419 B1 * | 11/2005 | Kalkunte et al. ............ 370/230 |
| 6,976,205 B1 | 12/2005 | Ziai et al. |
| 6,988,235 B2 | 1/2006 | Brown |
| 7,023,811 B2 | 4/2006 | Pinto |
| 7,031,304 B1 | 4/2006 | Arberg et al. |
| 7,062,570 B2 | 6/2006 | Hong et al. |
| 7,098,685 B1 * | 8/2006 | Agrawal et al. ............... 326/38 |
| 7,124,198 B2 | 10/2006 | Pinkerton |
| 7,131,140 B1 | 10/2006 | O'Rourke et al. |
| 7,134,796 B2 * | 11/2006 | Anderson .................... 385/88 |
| 7,164,678 B2 | 1/2007 | Connor |
| 7,218,632 B1 | 5/2007 | Bechtolsheim et al. |
| 7,251,704 B2 | 7/2007 | Solomon |
| 7,260,120 B2 | 8/2007 | Kang et al. |
| 7,269,661 B2 | 9/2007 | Ree et al. |
| 7,271,706 B2 | 9/2007 | Lee |
| 7,274,706 B1 | 9/2007 | Nguyen et al. |
| 7,283,528 B1 | 10/2007 | Lim et al. |
| 7,286,557 B2 * | 10/2007 | Feuerstraeter et al. ....... 370/465 |
| 7,292,586 B2 | 11/2007 | Dewan et al. |
| 7,292,591 B2 | 11/2007 | Parker et al. |
| 7,295,553 B2 | 11/2007 | Saitoh |
| 7,298,761 B2 | 11/2007 | Hong |
| 7,308,006 B1 | 12/2007 | Banerjee et al. |
| 7,349,399 B1 | 3/2008 | Chen et al. |
| 7,360,217 B2 | 4/2008 | Melvin et al. |
| 7,366,194 B2 | 4/2008 | Yu et al. |
| 2001/0027496 A1 | 10/2001 | Boucher et al. |
| 2002/0048270 A1 | 4/2002 | Allen et al. |
| 2003/0026252 A1 | 2/2003 | Thunquest et al. |
| 2003/0088689 A1 | 5/2003 | Alexander et al. |
| 2003/0103499 A1 | 6/2003 | Davis et al. |
| 2003/0154399 A1 | 8/2003 | Zuk et al. |
| 2003/0227920 A1 | 12/2003 | Benayoun et al. |
| 2004/0022094 A1 | 2/2004 | Radhakrishnan et al. |
| 2004/0030766 A1 | 2/2004 | Witkowski |
| 2004/0064590 A1 | 4/2004 | Starr et al. |
| 2004/0081145 A1 * | 4/2004 | Harrekilde-Petersen et al. .. 370/362 |
| 2004/0100952 A1 | 5/2004 | Boucher et al. |
| 2004/0109465 A1 | 6/2004 | Kim et al. |
| 2004/0128398 A1 | 7/2004 | Pettey |
| 2004/0177275 A1 | 9/2004 | Rose et al. |
| 2004/0218623 A1 | 11/2004 | Goldenberg et al. |
| 2005/0022017 A1 | 1/2005 | Maufer et al. |
| 2005/0076136 A1 | 4/2005 | Cho et al. |
| 2005/0089031 A1 | 4/2005 | Krueger |
| 2005/0108611 A1 | 5/2005 | Vogt |
| 2005/0114663 A1 * | 5/2005 | Cornell et al. ............... 713/168 |
| 2005/0120160 A1 | 6/2005 | Plouffe et al. |
| 2005/0149677 A1 | 7/2005 | Shimada et al. |
| 2005/0174153 A1 * | 8/2005 | Saeki ........................ 327/117 |
| 2005/0256975 A1 | 11/2005 | Kaniz et al. |
| 2006/0031600 A1 | 2/2006 | Ellis et al. |
| 2006/0120289 A1 | 6/2006 | Cunningham |
| 2006/0187928 A1 | 8/2006 | McGee et al. |
| 2006/0216958 A1 * | 9/2006 | Yee et al. ....................... 439/66 |

OTHER PUBLICATIONS

Adolf, Geier, "Patent Cooperation Treaty: PCT Notification of transmittal of the International Preliminary Report on Patentability (PCT Rule 71.1)," European Patent Office, Apr. 13, 2007, 7 pages.

Rummery, Audrey, "Patent Cooperation Treaty: PCT Notification of Transmittal of the International Search Report and the Written Opinion of the International Searching Authority, or the Declaration (PCT Rule 44.1)," European Patent Office, Jul. 5, 2006, 11 pages.

Kung, H.T., Gigabit Local Area Networks: A System Perspective, Apr. 1992, IEE Communications Magazine, vol. 30, Issue 4, pp. 79-89.

Cunningham, D.G., The Status of the 10-Gigabit Ethernet Standard, 2001, 27th European Conference on Optical Communication, 2001. ECOC '01, vol. 3, pp. 364-367.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Acayan, Joseph, "Facsimile Transmital", Apr. 22, 2008, Sayer Law Group, LLP, 1 page.

European Patent Office, "Communication Pursuant to Article 94(3) EPC", Aug. 18, 2009, 6 pages.

Balena, F., "Speed up searched with hash tables," Nov. 13, 2001, DevX.com all pages.

* cited by examiner

306

CONFIGURABLE PORTS FOR A HOST ETHERNET ADAPTER

CROSS-REFERENCE TO RELATED APPLICATIONS

The present application is related to the following copending U.S. patent applications:

U.S. patent application Ser. No. 11/097,609, entitled "Host Ethernet Adapter for Networking Offload in Server Environment", filed on even date herewith and assigned to the assignee of the present invention.

U.S. patent application Ser. No. 11/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application Ser. No. 11/096,571, entitled "Method and Apparatus for Providing a Network Connection Table", filed on even date herewith and assigned to the assignee of the present invention.

U.S. patent application Ser. No. 11/097,051, entitled "Network Communications for Operating System Partitions", filed on even date herewith and assigned to the assignee of the present invention.

U.S. patent application Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application Ser. No. 11/096,353, entitled "System and Method for a Method for Reducing Latency in a Host Ethernet Adapter (HEA)", filed on even date herewith and assigned to the assignee of the present invention.

U.S. patent application Ser. No. 11/097,055, entitled "Method and Apparatus for Blind Checksum and Correction for Network Transmissions", filed on even date herewith and assigned to the assignee of the present invention.

U.S. patent application Ser. No. 11/096,362, entitled "Method and System for Performing a Packet Header Lookup", filed on even date herewith and assigned to the assignee of the present invention.

U.S. patent application Ser. No. 11/097,430, entitled "System and Method for Computing a Blind Checksum in a Host Ethernet Adapter (HEA)", filed on even date herewith and assigned to the assignee of the present invention.

FIELD OF THE INVENTION

The present invention relates generally to a server environment and more specifically to adapters utilized in such an environment.

BACKGROUND OF THE INVENTION

The Internet and its applications have tremendously increased the number of clients' requests a server has to satisfy. Each client's request generates both network and storage I/Os. In addition, the advent of 10 gigabit (G) Ethernet and IP storage makes it possible to consolidate the data center communications on a single backbone infrastructure: Ethernet, TCP/IP.

Adapters are utilized in Network Interface Controllers (NICs) to receive data from 10 G sources. In such an adapter it is also desirable to handle data from other sources. For example there are still a significant number of 1 G sources. However it is a problem to support 1 G ports through the same interface as the 10 G port. The problem is that the 10 G port is a serial interface while the 1 G port is typically a parallel interface. Typically to accommodate both types of data sources would require additional pins on the NIC. These additional pins would necessarily increase the cost and complexity of the device.

Accordingly, what is desired is an adapter which can be utilized in a server environment which can accommodate multiple data sources but does not have any of the above-identified problems. The adapter should be easily implemented utilizing existing technologies. The adapter should also be cost effective and easily adapted to existing server environments.

The present invention addresses such a need.

SUMMARY OF THE INVENTION

An Ethernet adapter is disclosed. The adapter comprises a plurality of layers for allowing the adapter to receive and transmit packets from and to a processor. The plurality of layers include a high speed serializer/deserializer (high speed serdes) to receive data from and provide data to different speed data sources on the same pins.

A system and method in accordance with the present invention allows for an adapter to be utilized in a server environment that can accommodate both a 10 G and a 1 G source utilizing the same pins. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources. Finally the system allows for the adapter to use the same pins for multiple data sources.

DETAILED DESCRIPTION

The present invention relates generally to a server environment and more specifically to adapters utilized in such an environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention allows for an adapter to be utilized in a server environment that can accommodate both a 10 G and a 1 G source utilizing the same pins. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources. To more particularly describe the features of the present invention refer now to the accompanying drawings in conjunction with the accompanying Figures.

Figure 1:
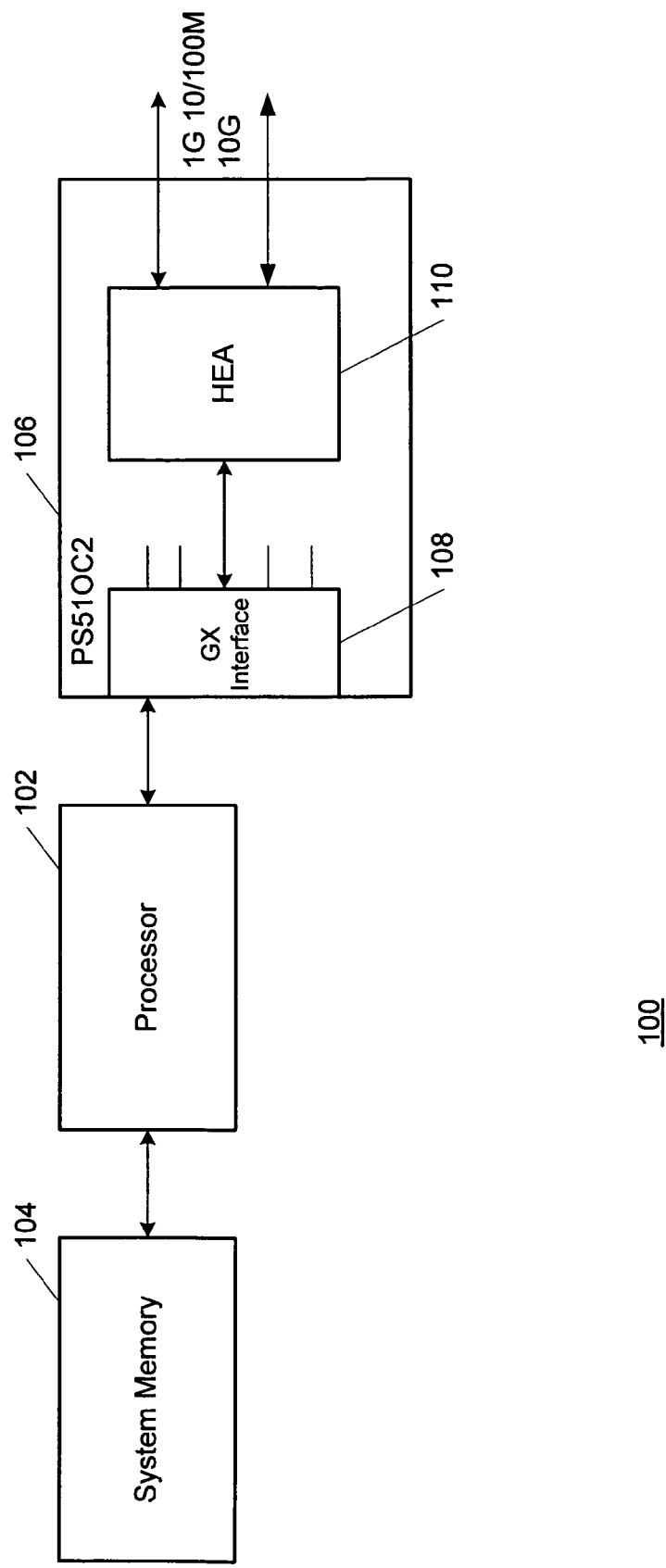
FIG. 1 is a block diagram of a server system in accordance with the present invention.

FIG. 1 is a block diagram of a server system 100 in accordance with the present invention. The server system 100 includes a processor 102 which is coupled between a memory 104 and an interface adapter chip 106. The interface adapter chip 106 includes an interface 108 to the private (Gx) bus of the processor 102 and a Host Ethernet Adapter (HEA) 110. The HEA 110 receives and transmits signals from and to the processor 102.

The HEA 110 is an integrated Ethernet adapter. A set of accelerator features are provided such that a server TCP/IP stack uses those features when and as required. The interface between the processor 102 and the interface adapter chip 106 has been streamlined by bypassing the PCI bus and providing interface techniques that enable demultiplexing and multi-queueing and packet header separation. In so doing an Ethernet adapter is provided that allows for improved functionality with high speed system while allowing for compatibility with legacy server environments.

Figure 2:
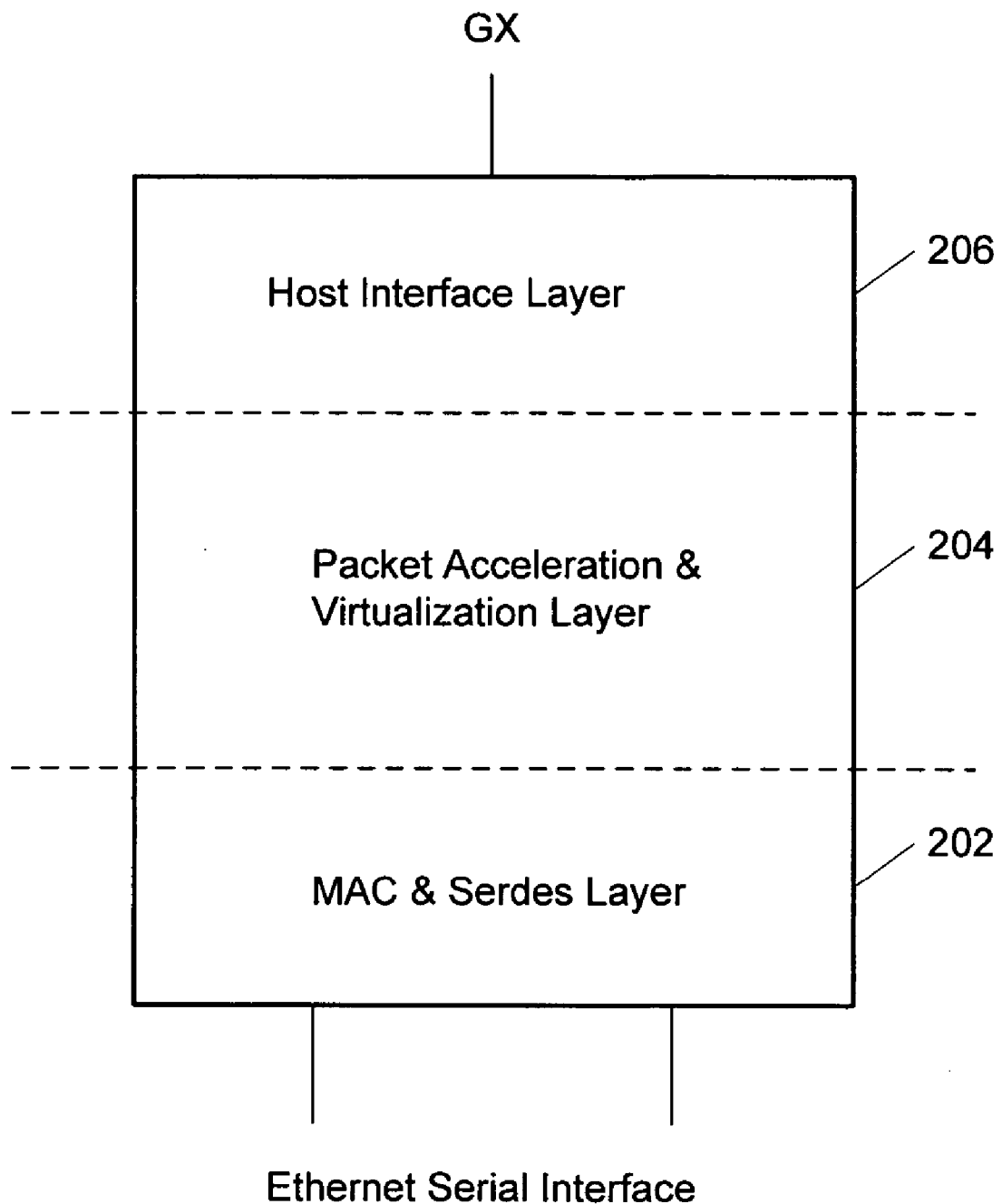
FIG. 2 is a simple block diagram of the a Host Ethernet Adapter (HEA) in accordance with the present invention.

FIG. 2 is a simple block diagram of the HEA 110 in accordance with the present invention. As is seen, the HEA 110 has a three layer architecture. The first layer comprises a Media Access Controller (MAC) and Serialization/Deserialization (Serdes) layer 202 which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or multiple 1 Gigabit interfaces.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operations and therefore provide improved latency. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor and communicates with layer 204. The layer 206 provides for multiple receive sub-queues per Queue Pair (QP) to enable effective buffer management for a TCP stack. The host layer 206 provides the context management for a given flow of data packets.

To describe the features of the HEA 100 in more detail refer now to the following discussion in conjunction with the accompanying figures.

MAC and Serdes Layer 202

Figure 3:
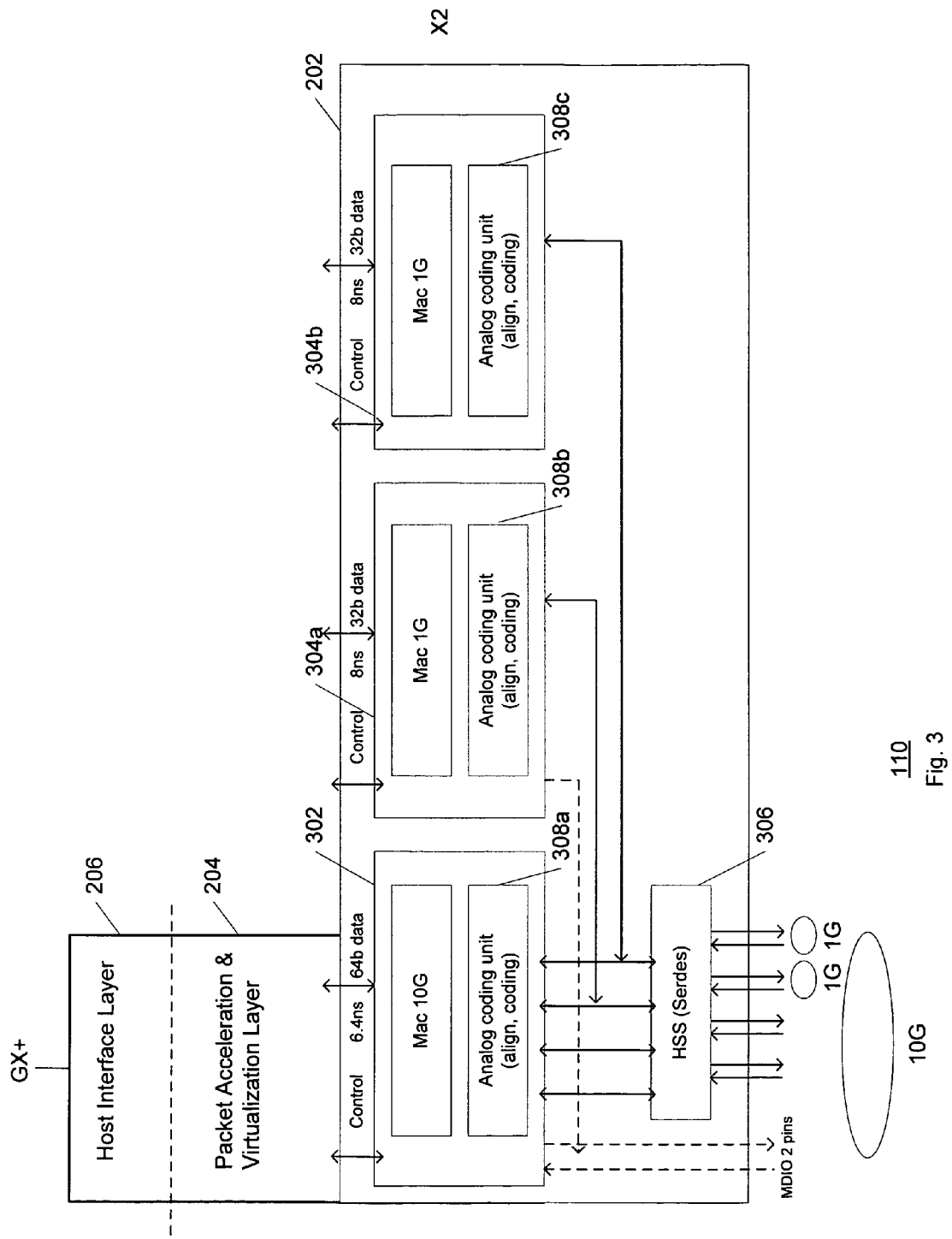
FIG. 3 is a block diagram of the HEA with a more detailed view of the MAC and Serdes Layer.

FIG. 3 is a block diagram of the HEA 110 with a more detailed view of the MAC and Serdes Layer 202. As is seen in this embodiment there is one 10 Gigabit MAC 302 and two 1 Gigabit MACs 304a and 304a. The MACs 302, 304a and 304b include physical coding units 308a, 308b and 308c for aligning and coding the received packets. The MACs 302, 304a and 304b are coupled to a High Speed Serializer/Deserialization (high speed serdes) 306. The high speed serdes 306 is capable of receiving data from and providing data to one 10 G source or four 1 G. As before mentioned the high speed serdes 306 includes a mechanism for ensuring that data from and to the data sources are handled appropriately. To describe this feature more detail refer now to the following discussion in conjunction with the accompanying Figures.

Figure 4:
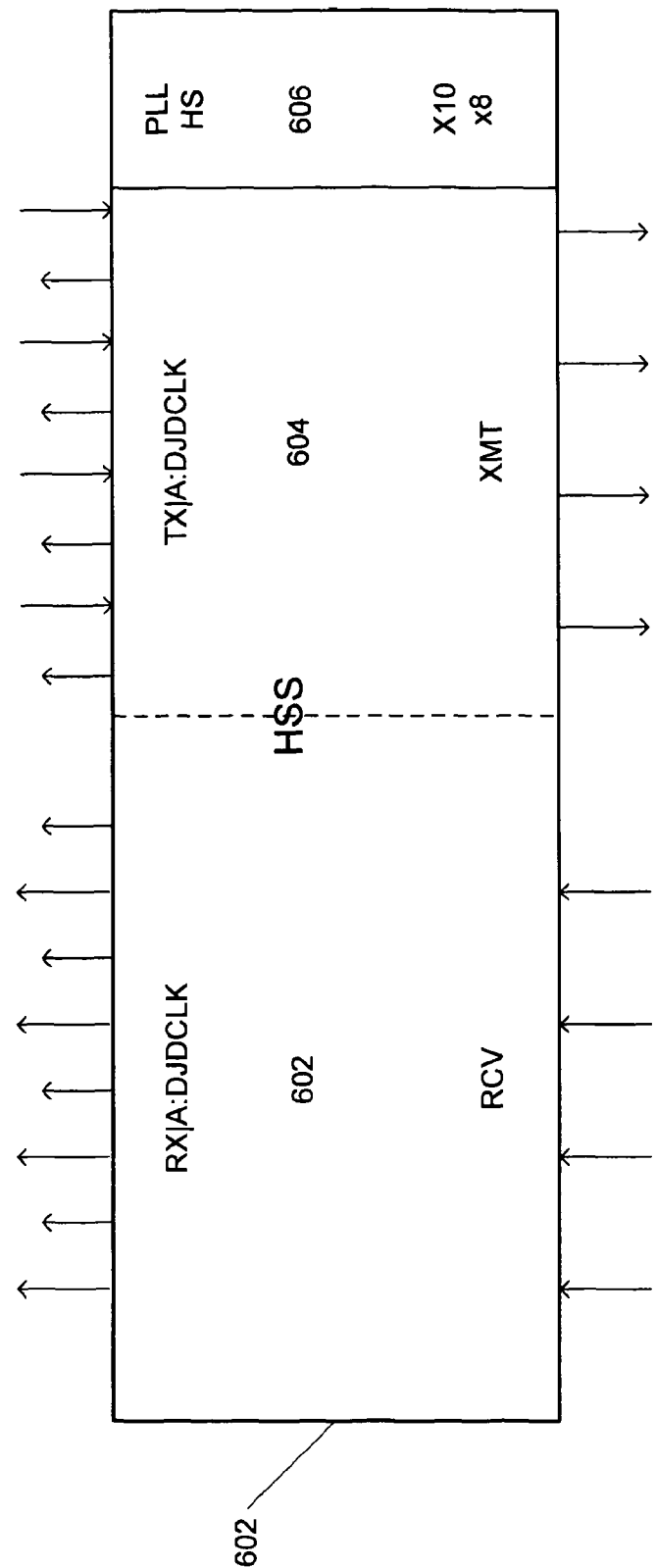
FIG. 4 is a more detailed diagram of the high speed serdes.

FIG. 4 is a more detailed diagram of the high speed serdes 306. As is seen in this embodiment the high speed serdes 306 includes a receive section 602 and a transmit section 604. There are four lanes associated with the high speed serdes 306. Each lane corresponds to one up bottom arrow and one down bottom arrow on the receive section 602 and the transmit section 604 respectively. In this embodiment a 10 G source requires four lanes and a 1 G source requires one lane. The high speed serdes 306 also includes a Phase Locked Loop (PLL) 606 which receives a reference clock signal from the NIC (not shown). The reference clock is relatively low compared to the data sources because the PLL 606 can be set to different frequency multiplication ratios to allow the different data sources. The high speed serdes 306 also can configured to allow for multiple modes of operation. In so doing, the different data sources can be accommodated since the PLL 606 has different multiplication ratios.

Below is an example of the operation of the high speed serdes 306 using a 312.5 MHz reference clock 10 G data source: Full rate mode at 3.125 Gbps 1 G data source: Half-rate mode at 1.25 Gbps The same high speed serdes Ref Clock can be used in both modes, because internal high speed serdes PLL 606 can be set to different frequency multiplication ratios.

312.5 MHz Ref Clock×10=3.125 GHz 312.5 MHz Ref Clock×8=2.5 GHz (high speed serdes half-rate mode then leads to 1.25 Gbps)

A system and method in accordance with the present invention allows for an adapter to be utilized in a server environment that can accommodate both a 10 G and a 1 source utilizing the same pins. This is accomplished through the use of a high speed serializer/deserializer (high speed serdes) which can accommodate both data sources. The high speed serdes allows for the use of a relatively low reference clock speed on the NIC to provide the proper clocking of the data sources and also allows for different modes to be set to accommodate the different data sources. Finally the system allows for the adapter to use the same pins for multiple data sources.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An Ethernet adapter comprising:

a plurality of layers for allowing the adapter to receive and transmit packets from and to a processor; wherein the plurality of layers include in one layer a plurality of media access controllers (MACs) and a high speed serializer/deserializer (high speed serdes) for receiving data from and providing data to different speed data sources on the same pins; wherein each of the plurality of MACs includes its own physical coding unit for aligning and coding the transmit packets, wherein the high speed serdes can be configured in different modes of operation by setting different frequency multiplication ratios; wherein the frequency of the reference clock is relatively low compared to the data sources because a phase locked loop (PLL) is adjustable to different frequency multiplication ratios to allow the different data sources.

2. The Ethernet adapter of claim 1 wherein the different speed data sources comprise a 10 Gigabit (G) source and a plurality of 1 G sources.

3. The Ethernet adapter of claim 1 wherein the high speed serdes comprises a receive section for receiving data from a data source;
a transmit section for transmitting data to a data source; and
a phase locked loop (PLL) for controlling the data rate of the transmit and receive sections.

4. The Ethernet adapter of claim 3 wherein the receive section and transmit share a plurality of lanes.

5. The Ethernet adapter of claim 1 wherein the different modes of operation comprise full rate mode and half rate mode.

6. The Ethernet adapter of claim 3 wherein the PLL controls the data rate by setting different multiplication ratios.

7. A network interface controller (NIC) comprising:
an interface to a private bus; and
an Ethernet adapter coupled to the interface; the Ethernet adapter comprising a plurality of layers for allowing the adapter to receive and transmit packets from and to a processor; wherein the plurality of layers include in one layer a plurality of media access controllers (MACs) and a high speed serializer/deserializer (high speed serdes) for receiving data from and providing data to different speed data sources on the same pins; wherein each of the plurality of MACs includes its own physical coding unit for aligning and coding the transmit packets; wherein the high speed serdes can be configured in different modes of operation by setting different frequency multiplication ratios; wherein the frequency of the reference clock is relatively low compared to the data sources because a phase locked loop (PLL) is adjustable to different frequency multiplication ratios to allow the different data sources.

8. The NIC of claim 7 wherein the different speed data sources comprise a 10 Gigabit (G) source and a plurality of 1 G sources.

9. The NIC of claim 7 wherein the high speed serdes comprises:
a receive section for receiving data from a data source;
a transmit section for transmitting data to a data source; and
a phase locked loop (PLL) for controlling the data rate of the transmit and receive sections.

10. The NIC of claim 7 wherein the receive section and transmit share a plurality of lanes.

11. The NIC of claim 7 wherein the different modes of operation comprise full rate mode and half rate mode.

12. The NIC of claim 7 wherein the PLL controls the data rate by setting different multiplication ratios.

13. A network interface controller (NIC) comprising:
an interface coupled to a private bus; and
an Ethernet adapter coupled to the interface, a plurality of layers for allowing the adapter to receive and transmit packets from and to a processor via the private bus, wherein the plurality of layers include in one layer a plurality of media access controllers (MACs) and a high speed serializer/deserializer (high speed serdes) for receiving data from and providing data to a 10 Gigabit (G) source and a plurality of 1 G sources on the same pins, wherein each of the plurality of MACs includes its own physical coding unit for aligning and coding the transmit packets, wherein the high speed serdes can be configured in different modes of operation by setting different frequency multiplication ratios; wherein the frequency of the reference clock is relative low compared to the data sources because a phase locked loop (PLL) is adjustable to different frequency multiplication ratios to allow the different data sources.

14. The NIC of claim 13 wherein the high speed serdes comprises a receive section for receiving data from a data source;
a transmit section for transmitting data to a data source; and
a phase locked loop (PLL) for controlling the data rate of the transmit and receive sections.

15. The NIC of claim 14 wherein the receive section and transmit share a plurality of lanes.

16. The NIC of claim 14 wherein the PLL controls the data rate by setting different multiplication ratios.

17. A server comprising: a processor; the processor including a private bus; and a network interface controller (NIC) coupled to the private bus, the NIC including an Ethernet adapter; the Ethernet adapter comprising a plurality of layers for allowing the adapter to receive and transmit packets from and to the processor; wherein the plurality of layers include in one layer a plurality of media access controllers (MACs) and a high speed serializer/deserializer (high speed serdes) to receive data from and provide data to different speed data sources on the same pins; wherein each of the plurality of MACs includes its own physical coding unit for aligning and coding the transmit packets, wherein the high speed serdes can be configured in different modes of operation by setting different frequency multiplication ratios; wherein the frequency of the reference clock is relatively low compared to the data sources because a phase locked loop (PLL) is adjustable to different frequency multiplication ratios to allow the different data sources.

* * * * *